US006611861B1

(12) United States Patent
Schairer et al.

(10) Patent No.: US 6,611,861 B1
(45) Date of Patent: Aug. 26, 2003

(54) INTERNET HOSTING AND ACCESS SYSTEM AND METHOD

(75) Inventors: David Schairer, Menlo Park, CA (US); Jourdan Clish, Los Gatos, CA (US)

(73) Assignee: XO Communications, Inc., Reston, VA (US)

( * ) Notice: Subject to any disclaimer, the term of this patent is extended or adjusted under 35 U.S.C. 154(b) by 0 days.

(21) Appl. No.: 09/259,498

(22) Filed: Feb. 26, 1999

Related U.S. Application Data
(60) Provisional application No. 60/076,318, filed on Feb. 27, 1998.

(51) Int. Cl.[7] ............................................. G06F 13/00
(52) U.S. Cl. ........................ 709/217; 709/225; 713/201
(58) Field of Search ............................... 709/217, 219, 709/222, 224, 239, 206, 218, 225, 228; 713/201, 205

(56) References Cited

U.S. PATENT DOCUMENTS

| | | | | |
|---|---|---|---|---|
| 5,751,961 A | * | 5/1998 | Smyk ........................ | 709/217 |
| 5,898,830 A | * | 4/1999 | Wesinger et al. ........... | 713/201 |
| 6,012,088 A | * | 1/2000 | Li et al. .................... | 709/219 |
| 6,098,108 A | * | 8/2000 | Sridhar et al. .............. | 709/239 |

* cited by examiner

*Primary Examiner*—Ayaz Sheikh
*Assistant Examiner*—Khanh Quang Dinh
(74) *Attorney, Agent, or Firm*—Finnegan, Henderson, Farabow, Garrett & Dunner, LLP

(57) ABSTRACT

A method of providing Internet hosting and access is described. A database is used to store hosting and access descriptors. The hosting and access descriptors describe the configuration of Internet services such as HTTP, SMTP, POP3, IMAP4, and FTP for a hosted site. When a client over the Internet, or other network, requests a service from the hosted domain, the DNS system is interfaced to the database to select a computer to use to support the requested access. The database can also be used to store load information about the computers available for providing Internet hosting and access. Once the DNS system selects a computer and returns the IP address of the computer to the client, the subsequent communications are between the client and the selected computer directly. The selected computer can access the database to retrieve configuration information to respond to service requests from clients. In this fashion, a single hosted site can be distributed across multiple computers, or multiple hosted sites can share a single computer. Because all of the necessary configuration information is stored in a common database, additional computers can switch between servicing requests for different domains easily and can also be added and removed easily.

20 Claims, 2 Drawing Sheets

LOGICAL LAYER    130

PHYSICAL LAYER    140

INTERNET HOSTING AND ACCESS SYSTEM AND METHOD

RELATED APPLICATIONS

This application relates to, claims the benefit of the filing date of, and incorporates by reference, the U.S. provisional patent application Ser. No. 60/076,318, entitled "Internet Hosting and Access System and Method," inventors David Schairer and Jourdan Clish, filed Feb. 27, 1998.

THE BACKGROUND OF THE INVENTION

1. The Field of the Invention

This invention relates to the field of Internet services. In particular, the invention relates to a technique for sharing the resources of a network of computers to provide Internet hosting and access services.

2. Background Information

Internet Service Providers (ISPs) provide, among other services, World Wide Web (web) hosting services. The hosting services allow users to set up web sites on computers owned by an ISP. Thus, users can provide the content for the web sites without having to build the underlying computer and network architecture to support the content and bandwidth requirements.

Previous implementations use one computer to support one web site. For example, one Windows NT computer would be associated with one domain name and one corresponding IP address. This system is particularly expensive because each site requires a different computer. It also does not support load balancing. Load balancing allows surges in client accesses of web sites to be distributed across multiple computers or allows computers to off load other services to other computers.

Other examples of prior systems are those supplied by Netscape Communications, Inc. Using the Netscape Communications technology, a given machine responds to multiple IP addresses. Given a particular IP address of the set of supported IP addresses, the Netscape server looks up the corresponding web site data for that IP address. One problem with this system is that this requires each hosted site to have its own IP address. Another problem with this solution is that load balancing can only be performed on a per computer basis.

Some systems have attempted to cluster computers to act together as one hosting machine. However, scaling such systems can be difficult and load balancing is still not as effective as desired. Furthermore, the clustering process is fairly static, for example, a group of five machines would be used to support a web site. If demand for a site becomes particularly high, it is necessary to manually configure additional machines to support the site. As accesses to web sites can spike for various, sometimes unpredictable, reasons, previous cluster systems can become overloaded because of an insufficient number of computers in the cluster yet inefficiently use computer resources because there are too many computers for normal web access traffic.

Thus, what is desired is an improved technique and system for hosting Internet services.

A SUMMARY OF THE INVENTION

A system for providing Internet hosting and access is described.

Some embodiments of the invention include a network of computers coupled to a database. The network of computers are also coupled to the Internet (or other communications network). The network of computers each have access to a fast shared memory. The fast shared memory includes some of the information in the database. The contents of the fast shared memory are synchronized between the machines. Using this structure, various computers in the network can act together to share Internet protocol addresses among the various web sites, or other Internet services, supported by the network of computers. Load balancing between the various computers can be dynamically performed.

The computers in the network can be configured based on information stored in the database, or the fast shared memory. For example, the configuration information might include the location of files for a web site as well as a list of supported services. This enables the configuration data to be used to dynamically configure the computers. A computer X in the network might be providing web services for a hosted domain "test.com" and simultaneously provide web and other services for other hosted domains. This sort of flexibility allows the network of computers to react quickly to high demand.

For example, many web sites have experienced overwhelming volume when a news story broke. Using some embodiments of this invention, a news organization could host its web sites on the network of computers. Dynamically, as more requests for the hosted web site reach the network of computes, more computing resources in the network will be allocated to the hosted site.

Also, the configuration information can selectively limit access to services. For example, a hosted web site might be limited to certain clients. The hosting and access descriptors stored in the database can support these limits. One embodiment uses access control lists to control access to the hosted services.

Also, the configuration information can include quota information. For example, the quota could limit the amount of disk space used or the total amount of bandwidth used at a given time, or per month. This allows the hosting ISP to control the usage of the network of computers.

In some embodiments, the network of computers support administrative functions and clustered hosting functions. In some embodiments, the administrative functions include domain name services (DNS). The DNS services allow for account hosting that is independent of the domain name used. One technique used is to support virtual IP addresses. A second technique is to support phantom IP addresses. Through the use of a host name information, many domains are supported by the same IP address. The DNS then differentiates between the various domains using the host name information. The clustered hosting functions provide the actual hosting of the various web sites, and other services.

Although many details have been included in the description and the figures, the invention is defined by the scope of the claims. Only limitations found in those claims apply to the invention.

A BRIEF DESCRIPTION OF THE DRAWINGS

The figures illustrate the invention by way of example, and not limitation. Like references indicate similar elements.

THE DESCRIPTION

Overview

Figure 1:
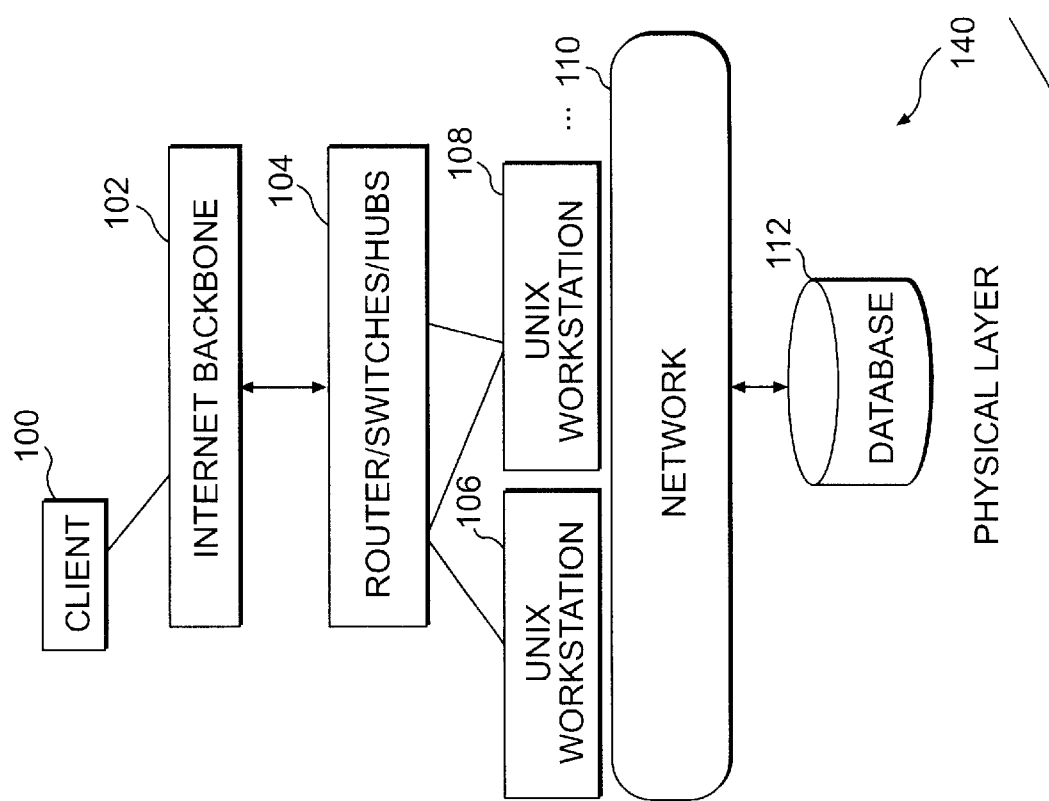
FIG. 1 illustrates both a physical view and a logical view of a network of computers supporting Internet hosting and accessing services.
Figure 1:
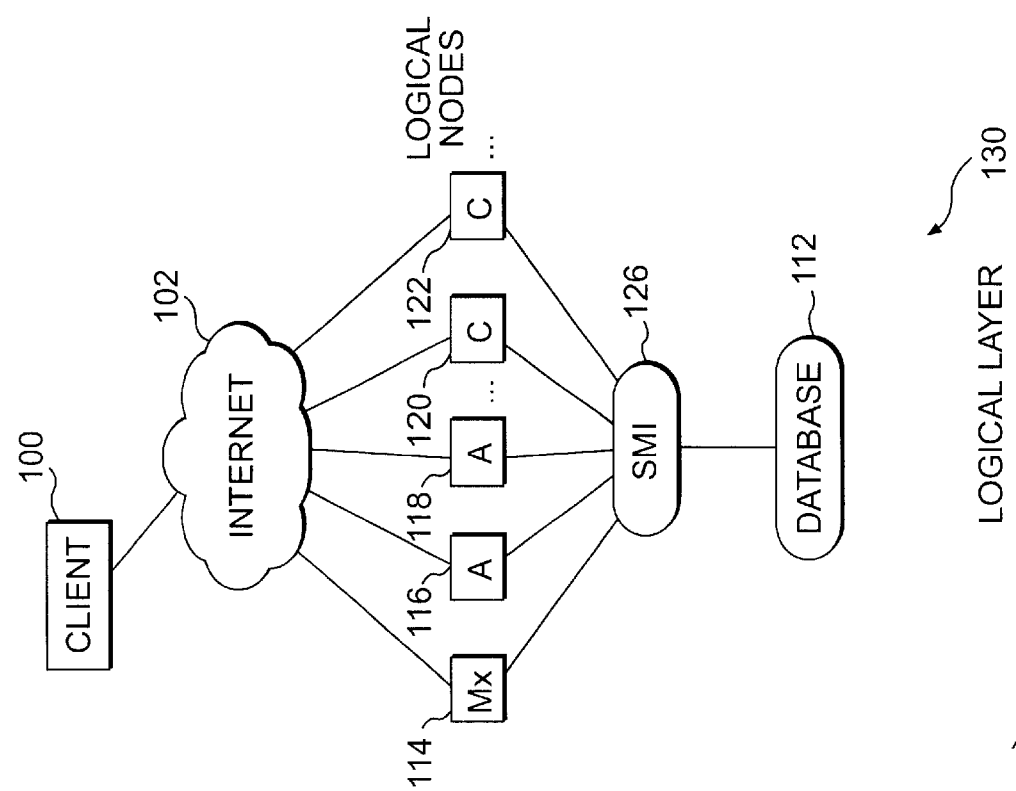

FIG. 1 shows the physical layer 140 and logical layer 130 of some embodiments of the invention. The physical layer 140 includes a database 112 coupled to a number of computers 106–108 via a network 110. The computers 106–108 are then coupled to routers, switches and hubs 104, which in turn are coupled to an Internet backbone 102. The computers 106–108 can be UNIX workstations, Windows NT workstations, or some other type of computer systems.

Logically, on top of the physical layer 140, are the database 112, a shared memory index (SMI) 126 and a number of logical nodes 114–122. The database 112 is a store of all the user data for the system. The SMI 126 acts as a cache to the database 112. The logical nodes 114–122 can include caches of the information stored in the SMI 126. Changes in the SMI 126 propagate to the caches of the logical nodes 114–122 in real time.

In some embodiments, each logical node 114–122 corresponds to a different computer 106–108. However, in other embodiments, multiple logical nodes are supported on a single computer.

The logical nodes 114–122 couple to the SMI 126. Each logical node 114–122 supports various applications, programs, processes and/or daemons. An example of a node is an administrative node 116. The administrative node 116 can include a DNS server and/or a web server for site administration. Another example of a node is a cluster node 120. A cluster node includes one or more of an HTTP server, an HTTPS server, an SMTP server, a POP3 server, an IMAP4 server, an FTP server, or other server. Another example node is the MX node 114 for managing e-mail.

In some embodiments, the cluster nodes 120–122 act together as one virtual machine. The administrative nodes 116–118 can act as another virtual machine. And the MX node 114 acts as a virtual machine. In some embodiments there is only one MX node per hosted site.

One benefit of the SMI 126 is that all of the logical nodes 114–122 are aware of the load on the other logical nodes. This allows for dynamic load balancing when the number of connections to the web server of a hosted site spikes. Other logical nodes can be added to take some of that load. The client 100 connecting to the hosted web site only sees a system that acts like a single web server. However, internally, because of the load balancing, a number of logical nodes are balancing the load between a number of computers.

An example of the benefit of such a system is, for example, if the computer 106 is shut down for repairs. Shortly, typically in less than thirty seconds, the other logical nodes recognize the shut down has occurred and can distribute the load among themselves, or add additional logical nodes to support demand. The connections from the client 100 to the computer 106 that was shut down will be, upon reloading by the client 100, distributed to other logical nodes.

DNS

In the prior art, a domain name, for example, "www.test.com" is intended to correspond to at least one Internet protocol (IP) address corresponding to a particular computer. Thus, a domain name "bob.test.com" is equally valid to access a particular computer with that name. The client 100 using a browser designates web sites using a uniform resource locator (URL) which typically includes a domain name. The browser on the client 100 issues a "get host by name" call to find an address for a domain name. The response from the domain name system (DNS) server would be the IP address of the specific computer supporting the domain name. The client would then use the IP address and open a connection to that specific computer. This solution is not effective for large scale hosting because it requires a large number of IP addresses, one for each site. Further, this solution is limiting because it ties the hosted site to a specific machine or set of machines.

In some previous systems, multiple web sites are hosted on a single computer by identifying a hosted web site by adding a directory name after the domain name in the URL. For example, the URL "www.test.com/<specific site name>." The specific directory name defines the requested host site. This allows the server to serve multiple web sites. This solution is not effective for hosted sites because it reduces the ability of the hosted site to have a branded identity. For example, "www.brandx.com" is easy to find, but "www.brandx.com/brandx/" is not. Further, a client that types "www.brandx.com" as their entire URL will not receive the Brand X home page.

One partial solution arrived with version 1.1 of the hypertext transfer protocol, or HTTP 1.1, a host field is added as part of the connection request by the browser. When a client 100 uses a browser that supports HTTP 1.1, the client 100 provides the host name that was supplied in the DNS lookup from the URL. Thus, in some embodiments of the invention, the host name is used to share IP addresses between multiple web sites being served by some embodiments of the invention. For example, "www.test.com" would be included in the request. This allows a single web server to support two web sites with a shared IP address. For example, if the DNS entry for "www.test.com" is 192.168.168.100 and the DNS entry for "www.example.com" is also 192.168.168.100, the host name can be used by the web server on the computer with the IP address 192.168.168.100 to control what web pages are served to the client 100. However this solution is still not complete because it does not in and of itself allow dynamic movement and load balancing of the hosted site.

In some embodiments, where a browser connects to the system and that browser does not support HTTP 1.1, the system responds with a web page indicating that HTTP 1.1 is not supported by the client browser. In some embodiments, the web page includes links to download areas for browsers supporting HTTP 1.1 .

In some embodiments, the functionality of the DNS server is enhanced as follows. The enhancements can co-exist with both HTTP 1.1 browsers and earlier browsers through the use of phantom IP addresses and virtual IP addresses, respectively. The following describes the techniques used in some embodiments when a client browser makes a connection to the system. When a client connects, the DNS server examines the entire domain name in the request. The DNS server uses a database such as the database 112 via the SMI 126, to determine a response.

Unlike the prior art where the response from the DNS server was static, i.e. pre-determined from mostly fixed configuration data, the enhanced DNS server is adapated to provide dynamic responses based on a database lookup. This allows different clients to be provided different IP addresses for the same service based on load, location, and other factors. The DNS server uses the domain name to resolve what IP address to provide to the client. This IP address is supplied back to the client 100. Note, in such a system, a web site can be distributed to multiple logical nodes, or several sites can share the same IP address on a single logical node.

The enhanced DNS server can provide virtual IP addresses and/or phantom IP addresses for hosted sites. A virtual IP address is a routable IP address according to the IP numbering protocol. However, the virtual IP address does not need to be permanently allocated to a particular computer. Further, a single computer can support multiple virtual IP addresses to support multiple logical nodes. However, each virtual IP address supports a single hosted site. A phantom IP address is similar to a virtual IP address except multiple hosted sites can be supported by a single phantom IP address, or set of phantom IP addresses. Hosted sites using phantom IP addresses rely on protocol specific fields such as the HTTP 1.1 host field to determine which hosted site should be served. Both solutions allow for dynamic load balancing; although, the phantom IP address technique provides a greater degree of flexibility and load balancing across multiple hosted sites.

Shared Memory Index

Figure 2:
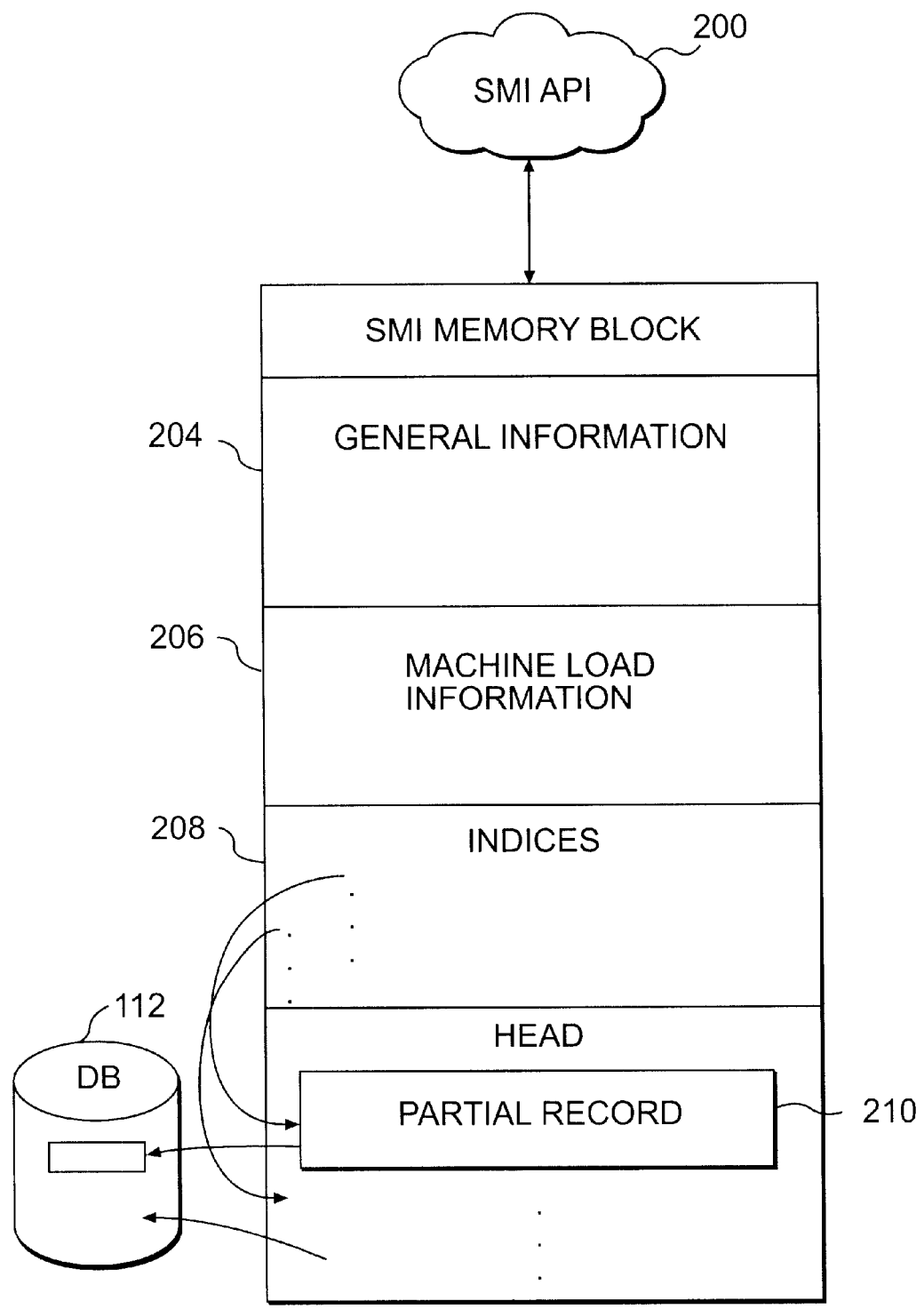
FIG. 2 illustrates the shared memory index architecture used in some embodiments of the invention.

FIG. 2, and the following discussion, describe the architecture of the SMI 126. In some embodiments, the SMI 126 includes every data element in the database 112 needed in transactional operations. Transactional operations are basic interactions between the client 100 and a server. In some embodiments, transactional operations include DNS and HTTP services. The following describes the memory sub-blocks of the SMI 126 and then describes the operation of the SMI 126 among various workstations.

The SMI 126 represents a block of shared memory between the various computers 106–108. The following describes the SMI 126 for some embodiments of the invention. However, what is important is that the SMI 126 provide fast and efficient IP address and domain name mapping. The SMI 126 is accessed through an application programmer interface (API) 200. The SMI API 200 enables services operating on the computers 106–108 to communicate with the SMI 126 and retrieve and store information.

The first subblock 204 of memory in the SMI 126 includes system information. Examples of the types of data stored in the subblock 204 are the last time the SMI 126 was loaded, the last time the SMI 126 was indexed, the number of logical nodes, the status of the computers supporting the logical nodes, the identity of the computers, and other general information.

The next subblock 206 of memory keeps the load information. The load information is a table of all the computers and the respective loads on the computers. The load information can also scale the results based on the capacity of the computer or store additional information about the type of computer. The last time a computer was contacted or contacted the SMI 126 can also be included. This information can also be stored in the database 112.

The next subblock 208 of the memory includes a series of indices the SMI 126 maintains on the database 112. These indices index into the heap subblock 210. The records in the heap subblock 210 are subsets of the records in the database 112. The heap subblock 210 includes a number of records that are fixed length.

The records in the heap subblock 210 include hosting and access descriptors, or configuration information. For example, a hosting and access descriptor for web services on the hosted site "www.test.com" might include configuration information for the Web server about the location of files for the web site. Similarly, the hosting and access descriptor for mail services on the same hosted site might include configuration information for a simple mail transport protocol (SMTP) daemon, the location where received mail is stored, and other configuration information.

Additional configuration data is also included in the SMI 126. Examples of such data include what services are available for this hosted site, where the files are located for the hosted site, whether the account is active or not, what type of logging for this account is required, etc. All of the hosting and access descriptors may also be stored in the database 112. The decision of which data is stored in the SMI 126 and which data is stored in the database 112 will depend primarily on performance requirements and available memory on the computers 106–108. The SMI API 200 provides an interface to the database 112 through the SMI 126. Thus, a look-up request made to the SMI API 200 will retrieve information from the database 112 if appropriate.

The SMI 126 is used primarily to support rapid look-up and indexing. Each computer 106–108 has a process, or daemon, supporting the SMI 126. Whenever the memory 204–210 is changed on one computer, the SMI daemon propagates that change to all the other shared memory blocks in the other computers.

The SMI 126 in some embodiments uses a hashing algorithm for finding and indexing data. Because re-indexing occurs much less frequently than the look-ups occur, the memory 204–210 is optimized for look-ups. For example, configuration information is changed much less often than the same information is looked up. Accordingly, the SMI 126 provides efficient look-up capabilities. Also, for example, read and write locks on the memory 204–210 are optimized for read accesses.

The following describes an example operation of the SMI 126. When a user wants to change a feature of their hosted web site, the user logs in through an administration node. The administration node makes the change to its cached copy of the SMI 126. The SMI daemon running on the administration node propagates the change to the database 112 and to all of the other copies of the SMI information on the other logical nodes. Upon receiving the change request, the SMI daemons on the other logical nodes apply write locks to their local SMI information and update their records from the database 112.

Now that the DNS and the SMI 126 have been described, an example of the combination is described. The following describes the process in greater detail from the client connection. Each DNS server can be associated with an SMI such as the SMI 126. When the DNS server receives a connection from the client 100, the DNS server sends a message to the SMI 126 to complete the lookup.

The message to the SMI 126 could be a call using the SMI API 200 to request a "get node by name" together with the domain name provided to the DNS server. The SMI indices 208 are accessed and a check is made to determine whether a "node by name" exists in the heap subblock 210, or the database 112. If no node exists, an error is returned.

In response to the "get node by name" request, the SMI 126 returns an IP address to the DNS server. If the account information for the hosted site indicates the use of virtual IP addressing, then the SMI 126 simply looks up the IP address of the particular logical node associated with the domain name. However, if phantom IP addressing is being used, the following occurs. The SMI 126 accesses the load information for logical nodes. The SMI 126 pseudo-randomly adjusts for distribution across loads (because other logical nodes may also be performing load balancing—this provides a normal distribution of the load balancing), and supplies an IP address for a logical node that is relatively lightly loaded to the DNS server. The DNS server returns the supplied IP address back to the client.

The client 100 then can use the supplied IP address. On the next connection to the system, from that client, the client 100 uses the supplied IP address to contact a logical node.

The web server on the specified cluster node is accessed. That server, on that cluster node, receives the request and provides the basic protocol processing. The basic protocol processing includes receiving the HTTP GET message, receiving all the headers, looking at the IP address and determining whether the IP address is a virtual IP address or a phantom IP address. If the IP address is a virtual IP address, the cluster node will use the "get by address" request supported by the SMI API 200. If the IP address is a phantom address, the cluster node will examine the host name. The SMI API 200 call "get by host name" is then used.

In either case, the SMI 126 returns a record from its heap 210, or if necessary the database 112. The record includes the hosting and access descriptor, or configuration data, for the requested service. That is, the retrieved record is used to configure the web server on the logical node. The hosting and access descriptor includes the route directory path for that particular site and other configuration data. The Web server can now access and serve the file(s) from disk. Also, if the hosting and access descriptor includes an access control list, the client can be authenticated for access before displaying the web page. Other services such as FTP, POP3, IMAP, SMTP can all be similarly provided.

What is claimed is:

1. A system for providing Internet hosting and access comprising:
    a plurality of computers, each of the plurality of computers adapted for providing respective Internet hosting and access functions according to a plurality of hosting and access descriptors; and
    a database in communication with the plurality of computers, the database comprising the plurality of hosting and access descriptors, each of the plurality of hosting and access descriptors corresponding to a hosted site, each of the plurality of hosting and access descriptors describing the configuration of Internet hosting and access services for the corresponding hosted site,
    the database further comprising availability and configuration data, suitability data, and load information corresponding to each of the plurality of computers,
    Internet hosting and access functions dynamically allocated over the plurality of computers based on the plurality of load information, the availability and configuration data, and the suitability data, so that a number of the plurality of computers is allocated to provide Internet hosting and access functions based on the plurality of load information and an appropriate virtualization of a request into a context of a hosted site.

2. The system of claim 1, further comprising a domain name server in communication with the plurality of computers and the database, the domain name server adapted to respond to a request for Internet access from a client by selecting a computer in the plurality of computers using the plurality of load information in the database.

3. The system of claim 2, wherein the selecting further comprises identifying a computer with a low load using the plurality of load information in the database.

4. The system of claim 1, wherein a computer in the plurality of computers receives a request for Internet access from a client, the request including an Internet protocol address, and the computer identifies a hosted site using the Internet protocol address.

5. The system of claim 4, wherein the request includes a domain name, and the computer identifies a hosted site using the domain name.

6. The system of claim 4, wherein the computer uses the database to retrieve a corresponding hosting and access descriptor for the hosted site.

7. The system of claim 6, wherein the computer configures a service using the corresponding hosting and access descriptor for the hosted site and responds to the request responsive to configuring the service.

8. The system of claim 1, wherein the plurality of computers includes at least one computer adapted for providing a hypertext transfer protocol server.

9. The system of claim 1, wherein the plurality of computers includes at least one computer adapted for providing a file transport protocol server.

10. The system of claim 1, wherein the plurality of computers includes at least one computer adapted for providing a simple mail transport protocol server.

11. A method of providing Internet hosting and access using a plurality of computers, the method comprising:
    receiving a lookup request for a domain name at a domain name server;
    accessing a database using the domain name server to select a computer in the plurality of computers, wherein the database comprises availability and configuration data, suitability data, and load information corresponding to each of the plurality of computers,
    and wherein Internet hosting and access functions are dynamically allocated over the plurality of computers based on the plurality of load information, the availability and configuration data, and the suitability data, so that a number of the plurality of computers is allocated to provide Internet hosting and access functions based on the plurality of load information and an appropriate virtualization of a request into a context of a hosted site;
    responding to the lookup request with an Internet protocol address corresponding to the computer;
    receiving a request for Internet access at the computer;
    selecting a hosting and access descriptor using the database;
    using the hosting and access descriptor to configure the computer; and
    responding to the request using the computer.

12. The method of claim 11, wherein the accessing further comprises identifying a computer with a low load using the plurality of load information in the database.

13. The method of claim 11, wherein the database includes a plurality of quotas, each of the plurality of quotas corresponding to limits for respective hosted sites in a plurality of hosted sites, and the accessing further comprises rejecting the lookup request if the hosted site corresponding to the lookup request has exceeded the respective quota in the plurality of quotas.

14. The method of claim 11, wherein the request for Internet access includes an Internet protocol address, and the selecting further comprises using the Internet protocol address to select the hosting and access descriptor in the database.

15. The method of claim 11, wherein the request for Internet access includes a domain name, and the selecting further comprises using the domain name to select the hosting and access descriptor in the database.

16. The method of claim 11, wherein the hosting and access descriptor includes configuration information for a hypertext transfer protocol server.

17. The method of claim 11, wherein the hosting and access descriptor includes an access control list, the access control list including a list of clients permitted to use a service on the computer.

18. An apparatus for providing Internet hosting and access using a plurality of computers, the apparatus comprising:

means for receiving a lookup request for a domain name;

means for accessing a database to select a computer in the plurality of computers, wherein the database comprises availability and configuration data, suitability data, and load information corresponding to each of the plurality of computers, and wherein Internet hosting and access functions are dynamically allocated over the plurality of computers based on the plurality of load information, the availability and configuration data, and the suitability data, so that a number of the plurality of computers is allocated to provide Internet hosting and access functions based on the plurality of load information and an appropriate virtualization of a request into a context of a hosted site;

means for responding to the lookup request with an Internet protocol address corresponding to the computer;

means for receiving a request for Internet access at the computer;

means for selecting a hosting and access descriptor using the database;

means for using the hosting and access descriptor to configure the computer; and means for responding to the request using the computer.

19. A computer program product comprising a computer usable medium having a computer readable program code embodied therein, the computer program comprising:

a set of instructions for receiving a lookup request for a domain name;

a set of instructions for accessing a database to select a computer in a plurality of computers, wherein the database comprises availability and configuration data, suitability data, and load information corresponding to each of the plurality of computers, and wherein Internet hosting and access functions are dynamically allocated over the plurality of computers based on the plurality of load information, the availability and configuration data, and the suitability data, so that a number of the plurality of computers is allocated to provide Internet hosting and access functions based on the plurality of load information and an appropriate virtualization of a request into a context of a hosted site;

a set of instructions for responding to the lookup request with an Internet protocol address corresponding to the computer;

a set of instructions for receiving a request for Internet access at the computer;

a set of instructions for selecting a hosting and access descriptor using the database;

a set of instructions for using the hosting and access descriptor to configure the computer; and a set of instructions for responding to the request using the computer.

20. A computer data signal embodied in a carrier wave comprising a computer program, the computer program comprising:

a set of instructions for receiving a lookup request for a domain name;

a set of instructions for accessing a database to select a computer in a plurality of computers, wherein the database comprises availability and configuration data, suitability data, and load information corresponding to each of the plurality of computers, and wherein Internet hosting and access functions are dynamically allocated over the plurality of computers based on the plurality of load information, the availability and configuration data, and the suitability data, so that a number of the plurality of computers is allocated to provide Internet hosting and access functions based on the plurality of load information and an appropriate virtualization of a request into a context of a hosted site;

a set of instructions for responding to the lookup request with an Internet protocol address corresponding to the computer;

a set of instructions for receiving a request for Internet access at the computer;

a set of instructions for selecting a hosting and access descriptor using the database;

a set of instructions for using the hosting and access descriptor to configure the computer; and a set of instructions for responding to the request using the computer.

* * * * *